(12) United States Patent
Müller et al.

(10) Patent No.: US 9,168,498 B2
(45) Date of Patent: Oct. 27, 2015

(54) METHOD AND DEVICE FOR PRODUCING VERY FINE PARTICLES AND COATING SUCH PARTICLES

(75) Inventors: Rainer Helmut Müller, Berlin (DE); Jan Möschwitzer, Berlin (DE)

(73) Assignee: ABBVIE DEUTSCHLAND GMBH & CO KG, Wiesbaden (DE)

( * ) Notice: Subject to any disclaimer, the term of this patent is extended or adjusted under 35 U.S.C. 154(b) by 1536 days.

(21) Appl. No.: 12/092,308

(22) PCT Filed: Oct. 13, 2006

(86) PCT No.: PCT/EP2006/009930
§ 371 (c)(1),
(2), (4) Date: Aug. 19, 2008

(87) PCT Pub. No.: WO2007/051520
PCT Pub. Date: May 10, 2007

(65) Prior Publication Data
US 2009/0297565 A1 Dec. 3, 2009

(30) Foreign Application Priority Data
Nov. 4, 2005 (DE) .......................... 10 2005 053 862

(51) Int. Cl.
*B01J 13/02* (2006.01)
*B01J 2/00* (2006.01)
(Continued)

(52) U.S. Cl.
CPC ............... *B01J 2/003* (2013.01); *B01F 5/0256* (2013.01); *B01F 5/0451* (2013.01);
(Continued)

(58) Field of Classification Search
CPC ............. A61K 9/14; A61K 9/50; A61K 9/16; A61K 9/5089; A61K 9/1682; B01J 13/02
USPC .................................................. 264/5, 9, 11
See application file for complete search history.

(56) References Cited

U.S. PATENT DOCUMENTS

| 5,091,187 A | 2/1992 | Haynes |
| 5,145,684 A | 9/1992 | Liversidge |

(Continued)

FOREIGN PATENT DOCUMENTS

| DE | 45482 | 11/1966 |
| DE | 10160625 A1 | 12/2001 |

(Continued)

OTHER PUBLICATIONS

English abstract of FR2152452.*
(Continued)

*Primary Examiner* — Larry Thrower
*Assistant Examiner* — Xue Liu
(74) *Attorney, Agent, or Firm* — Jeffrey S. Melcher; Manelli Selter PLLC

(57) ABSTRACT

Disclosed are methods and devices for producing very fine particles which are then coated with protective polymers in another step of the process. The particles are produced using a method in which a liquid flow comprising a particle-free liquid 1 that contains the active substance in a dissolved form is combined with a second liquid flow comprising a liquid 2 in a high-energy zone or no sooner than two seconds before reaching the high-energy zone. Said two liquids can be mixed with each other while the active substance dissolved in liquid 1 is insoluble or more difficult to dissolve in liquid 2 than in liquid 1 and settles in the form of particles in the high-energy zone or within a maximum of 2 seconds before reaching the high-energy zone when the two liquids are mixed. The obtained particles are introduced into an aqueous outer phase which contains the coating materials in a dissolved form and are then subjected to a drying step such that said materials settle on the particles as a closed coating. The coated particles are protected from damaging influences and are provided with modified release kinetics compared to uncoated particles.

28 Claims, 9 Drawing Sheets

(51) Int. Cl.
  *B01F 5/02* (2006.01)
  *B01F 5/04* (2006.01)
  *B01F 5/06* (2006.01)
  *B01F 11/02* (2006.01)
  *B01F 15/02* (2006.01)
  *B01J 2/02* (2006.01)
  *B01J 2/18* (2006.01)
  *B01F 7/00* (2006.01)

(52) U.S. Cl.
  CPC ............ *B01F 5/0646* (2013.01); *B01F 5/0647* (2013.01); *B01F 5/0652* (2013.01); *B01F 5/0685* (2013.01); *B01F 11/0258* (2013.01); *B01F 15/0203* (2013.01); *B01J 2/02* (2013.01); *B01J 2/18* (2013.01); *B01F 7/00775* (2013.01)

(56) References Cited

U.S. PATENT DOCUMENTS

| | | | |
|---|---|---|---|
| 5,389,382 A | 2/1995 | List | |
| 5,858,410 A | 1/1999 | Muller | |
| 6,177,103 B1* | 1/2001 | Pace et al. | 424/489 |
| 6,447,806 B1 | 9/2002 | Gassman | |
| 6,482,438 B1 | 11/2002 | Singh et al. | |
| 6,607,784 B2 | 8/2003 | Kipp | |
| 2002/0127278 A1 | 9/2002 | Kipp | |
| 2005/0139144 A1 | 6/2005 | Muller | |
| 2006/0096522 A1 | 5/2006 | Singh | |

FOREIGN PATENT DOCUMENTS

| | | |
|---|---|---|
| DE | 102005048201 | 10/2005 |
| EP | 0143196 A2 | 8/1984 |
| EP | 0143296 | 8/1984 |
| EP | 0461930 | 12/1991 |
| EP | 1157726 | 11/2001 |
| EP | 1219292 B1 | 12/2001 |
| EP | 1652515 | 5/2006 |
| FR | 2152452 | 4/1973 |
| GB | 2353215 | 2/2001 |
| WO | 0038811 | 7/2000 |
| WO | 01/03670 | 1/2001 |
| WO | 02055059 | 7/2002 |
| WO | 03/080034 A1 | 3/2003 |
| WO | 03033097 | 4/2003 |
| WO | 03061816 | 7/2003 |
| WO | 2005053640 | 6/2005 |

OTHER PUBLICATIONS

Sucker, H., Hydrosole—eine Alternative für die parenterale Anwendung von schwer wasserlöslichen Wirkstoffen, in: Müller, R. H., Hildebrand, G. E., (ed.), Pharmazeutische Technologie : Moderne Arzneiformen, 2nd edition, 1998, WVG, Stuttgart.
B. Böhm, Dissertation, FU Berlin, 1999.
M. Grau, Dissertation, FU Berlin, 2000.
Fichera, M.A., Wissing, S.A., Müller, R.H., Effect of 4000 bar homogenisation pressure on particle diminution on drug suspensions, Int. Meeting on Pharm., Biopharm. and Pharm. Technology, Nuremberg, 679-680, 2004.
K. Peters, Dissertation, FU Berlin, 1999.
S. Anger, Dissertation, FU Berlin, 2004.
Müller, R. H., Böhm, B. (ed.), Dispersion Techniques for Laboratory and Industrial Scale Processing, Wissenschaftliche Verlagsgesellschaft Stuttgart, 113 S., 2001, p. 77.
Bianchini, R., Resciniti, M., Vecchio, C. Technology evaluation of aqueous enteric coating systems with and without insoluble additives, Drug Dev Ind Pharm 17, 1779-1794, 1991; company information Röhm, Pharmapolymere, Magensaftresistente Überzüge, 2003.
Nguyen, et al., "Topical Review," (Feb. 1, 2005), Journal of Micromechanics & Microengineering, Institute of Physics Publishing, Bristol, GB, pp. R1-R16.

* cited by examiner

7a)

7b)

7c)

METHOD AND DEVICE FOR PRODUCING VERY FINE PARTICLES AND COATING SUCH PARTICLES

CROSS-REFERENCE TO RELATED APPLICATIONS

This application is a national stage entry under 35 U.S.C. 371 of International Application No. PCT/EP2006/009930, filed 13 Oct. 2006, designating the United States. This application claims foreign priority under 35 U.S.C. 119 and 365 to German Patent Application No. 10 2005 053 862.2, filed 4 Nov. 2005.

FIELD OF THE INVENTION

The invention describes a method and a device for the preparation of suspensions of very fine particles and a method and a device for coating or covering such very fine particles.

Methods and devices for producing very fine particles which are then coated with protective polymers in a further process step are described.

PRIOR ART

Micronization is a process for producing particles having a size in the range of a few micrometers, usually in the range of from 1 μm to 10 μm. Micronization is often used in the pharmaceutical sector in order to improve the administration of drugs, e.g. by an increased oral bioavailability. The reduction in the particle size leads to an increase in the surface area, and in accordance with Noyes-Whitney law, the increased surface area leads to an accelerated rate of dissolution of the particles. Oral bioavailability problems can be reduced by micronizing if the rate of dissolution or the solubility are parameters which limit uptake (so-called Class II drugs according to the BCS (Biopharmaceutics Classification System)). Nevertheless, an increasing number of recently prepared compounds show even lower solubilities and associated therewith even lower rates of dissolution than the abovementioned drugs. In many cases micronizing is therefore no longer adequate to achieve a sufficiently high rate of dissolution and, resulting therefrom, a sufficiently high bioavailability.

The next step was then nanonizing of drug powders, i.e. conversion of drug microparticles into drug nanoparticles having an average particle diameter in the nanometer range (from approx. 2-3 nm to 1,000 nm). Drug nanoparticles can be prepared with the aid of so-called "bottom-up" or alternatively with "top-down" technologies. In bottom-up technologies molecules are the starting point, and particle formation is arrived at via association thereof. The conventional bottom-up technique is precipitation, in which the drug is dissolved in a solvent and the solvent is added to a non-solvent, which leads to precipitation of drug nanocrystals. This principle is utilized in the so-called "hydrosol technology" of Sucker and List (U.S. Pat. No. 5,389,382, U.S. Pat. No. 6,447,806). The particles formed are crystalline in nature, especially if they have a particle size in the upper nanometer range. The precipitation is also described in combination with specific polymers, which are used to stabilize the precipitated drug nanoparticle dispersions (WO 00 2003/080034 A3). A precipitation method which leads to precipitation of amorphous particles is also described. This product with the commercial name "Nanomorph™" was originally developed by the company Knoll in Germany (EP 1 219 292 B1). Many problems are associated with the precipitation techniques:

1. After the start of the crystallization process it may be difficult to inhibit the crystal growth, which leads to a formation of large crystals beyond the nanometer range, i.e. to the formation of drug microparticles.
2. To maintain the physical stability of the suspension prepared, lyophilization is recommended (Sucker, H., Hydrosole—eine Alternative für die parenterale Anwendung von schwer wasserlöslichen Wirkstoffen, in: Müller, R. H., Hildebrand, G. E., (ed.), Pharmazeutische Technologie Moderne Arzneiformen, 2nd edition, 1998, WVG, Stuttgart).
3. In the case of precipitated particles in the amorphous state in particular, it is difficult to maintain this amorphous state during the shelf life, which is typically 3 years for pharmaceutical products. If the particles produced as amorphous particles have in particular a size in the upper nanometer range (>500 nm) they have a greater tendency towards recrystallization.

Continuation of the crystal growth after the precipitation is a considerable problem of the precipitation operation. Sucker et al. solve this problem by using a further process step after the precipitation, i.e. by lyophilization of the drug nanocrystal suspension. In many cases, however, not a dry product but an aqueous suspension is required. One method for maintaining the particle size achieved by the precipitation is combination of the precipitation with a heat treatment (U.S. Pat. No. 6,607,784). After the precipitation the drug suspension obtained is exposed to a second, energy-introducing step, e.g. by increasing the temperature, high-speed stirring or a homogenization process. This introduction of energy has two effects:

1. transformation of the particles present in partly or completely amorphous form into a completely crystalline state and
2. maintenance of the particle size and prevention of particle growth.

It was indeed possible to solve or at least minimize the problem of particle growth by the combination of precipitation and the conditioning process. However, because of the "perfection" of the drug crystals this combination is not capable of overcoming the limitation in the particle size reduction. It was therefore indeed possible to report a preserving of the particle size obtained, but no further particle size reduction.

On the basis of these considerations, there was a clear need for improved technologies for producing drug nanocrystals.

The alternatives are the "top-down" technologies, i.e. a "coarse" powder is the starting point, which is then comminuted in various ways to give various types of drug nanocrystals. A simple technique is grinding of drug microsuspensions in a ball mill. The drug powder is suspended in a surfactant solution and the suspension obtained is then introduced into a mill containing beads as grinding material. The beads are agitated by stirrers and the drug microcrystals are ground to drug nanocrystals between the grinding beads. Alternatively, instead of using a stirrer the entire grinding vessel together with balls and suspension can be agitated (U.S. Pat. No. 5,145,684). Disadvantages are associated with the use of mills for comminution of particles:

1. Depending on the hardness of the drug crystals, the grinding operation can take up to several days in the case of hard, crystalline drugs. As a result, this is not a production-friendly process.
2. During the grinding operation, the grinding balls are abraded, which leads to contamination of the drug nanoparticle suspension. Contamination with glass microparticles has been reported when glass grinding beads are used (reference: Buchmann), and similarly when zirconium oxide grinding beads were used contamination with values of more than 70 ppm were found, the extent of the contamination of course depending on whether the drug is rather hard or soft.

3. Grinding of aqueous suspensions over a duration of several days can also lead to bacterial growth and multiplication of bacteria, as a result of which there may be possible microbiological problems in the pharmaceutical product.

4. The scale-up process (increasing the scale) has some limitations due to the weight of the ball mills. Assuming a hexagonal packing of the grinding balls which are spherically equal in size, these take up 76% of the mill volume, while only 24% of the volume remains for the suspension to be ground. In the case of a mill having a capacity of 1,000 l, this means that only approximately 240 l of suspension can be prepared. Depending on the density of the grinding material (e.g. zirconium dioxide=3.69 kg/l), such a mill would weigh between approx. 2.8 tonnes, and a further increase in the capacity of the mill is not possible because of the total weight.

There is therefore a definitive limitation here with respect to an increase in scale (scale-up). For larger batches which exceed the filling volume of these bead mills, a bead mill which operates in a circulation method is therefore necessary. The suspension is pumped continuously through the bead mill. However, the situation is also not improved considerably as a result, since an increased batch size of course at the same time lengthens the grinding time required.

An alternative is the use of the high pressure homogenization technique. In this, the powder is dispersed in the surfactant solution and the suspension obtained is then subjected to a high pressure homogenization process, e.g. by using a piston-gap homogenizer (U.S. Pat. No. 5,858,410) or utilizing the jet stream principle (realized with the Microfluidizer U.S. Pat. No. 5,091,187). The comminution principle of the Microfluidizer comprises frontal collision of two flows, which collide with one another at high speed. A great disadvantage of this method is the relative large number of cycles required to obtain drug nanoparticles. The 50-100 homogenization cycles required, mentioned in the example (U.S. Pat. No. 5,091,187), are not particularly production-friendly. In addition, the Microfluidizer principle is less effective compared with the piston-gap method, and especially in the case of very hard crystals it leads to an undesirable content of microparticles in the nanosuspension. The piston-gap homogenization of suspensions of a drug in water leads to drug nanocrystals having an average particle size in the range of from approx. 200 nm to 1,000 nm. Cavitation was described in this context as the comminution principle (U.S. Pat. No. 5,858,410). An effective particle comminution in non-aqueous media or in mixtures of water and water-miscible liquids has since also been described. Examples of non-aqueous media are liquid polyethylene glycols (PEG) (e.g. PEG 400 or PEG 600) or oils (e.g. medium-chain triglycerides (MCT)). The advantage of these nanosuspensions is that they can be filled directly into hard or soft gelatine capsules. Homogenization in aqueous mixtures, such as e.g. water/ethanol mixtures, leads to suspensions which can easily be spray dried. Homogenization in water/glycerol mixtures leads directly to isotonic products for parenteral administration. The particle size which can be achieved in high pressure homogenization depends on the homogenization pressure and the softness or hardness of the substance to be processed. For relatively soft drugs, diameters of between 200 nm and 300 have been published (e.g. Paclitaxel (B. Böhm, Dissertation, FU Berlin, 1999)). In the case of relatively hard active compounds, the diameters would rather be in the range of from 700 nm to 1,000 nm (e.g. M. Grau, Dissertation, FU Berlin, 2000). For the latter group of drugs in particular, more efficient comminution methods are particularly desirable. The particle sizes cited above were obtained by homogenization under a pressure of 1,500 bar. It is known from the literature that smaller particle sizes can be obtained by an increase in the homogenization pressure, e.g. from 500 bar to 1,500 bar. Hard crystalline substances were consequently homogenized under pressures of up to 4,000 bar. In spite of more than twice the homogenization pressure, however, the resulting particle sizes remain practically unchanged (Fichera, M. A., Wissing, S. A., Müller, R. H., Effect of 4000 bar homogenisation pressure on particle diminution on drug suspensions, Int. Meeting on Pharm., Biopharm. and Pharm. Technology, Nuremberg, 679-680, 2004). One explanation for this is the increasing crystallinity of the particles during the homogenization process. At the start, the particles break at weak points, that is to say in particular at defects or in amorphous regions. As the comminution progresses, however, the number of these defects or amorphous regions decreases constantly, and the smaller particles produced become increasingly more perfect. At a certain point in the homogenization operation only almost perfect crystals remain. Further comminution, e.g. by doubling the homogenization pressure, is no longer possible, since the force required for this increases in a non-linear manner with ever more perfect crystals. This is an exponential increase. If the steep part of the curve has already been reached, even doubling of the homogenization pressure has only a slight influence on the size. It is clear from this that in high pressure homogenization a maximum dispersivity can be achieved under pressures in the range of 1,500 bar. In order to achieve a further particle size reduction for a particular drug, greatly improved comminution techniques must be used.

Summarizing, it can be said: The problems associated with the production of drug nanocrystals by precipitation, such as difficulties in maintaining the particle size and the associated specific methods required (e.g. lyophilization), lead to the fact that it has hitherto been possible to find scarcely any or only few uses for these products on the market. It was possible to solve or minimize a potential problem, namely the subsequent particle growth occurring after the precipitation, by using the principle of subsequent heat treatment, e.g. by introduction of energy, which leads to preservation of the particle size achieved by the precipitation (e.g. U.S. Pat. No. 6,607,784).

Technologies which can be used for drugs which are poorly soluble in all media are the ball mill techniques and the high pressure homogenization technologies. Problems associated with the ball mills are the long grinding times and a potential contamination of the product. It has been possible to overcome these limitations by using piston-gap homogenizers. However, there continues to be a need for improved homogenization technologies, since the non-linear relationship between the pressure and the crystal size which can be achieved, as a function of the crystallinity, limits the minimum particle size which can be achieved.

There is therefore a clear need for novel production methods which:

1. avoid the limitation of the particle size reduction due to the perfect crystals present and
2. lead to very small particles which are usually smaller than 300 nm and preferably smaller than 200 nm and ideally smaller than 100 nm.

SUMMARY OF THE INVENTION

The object of this invention is therefore to provide a method for producing coated particles, in particular nanoparticles, which dissolve rapidly, transport drugs to the site of action in a targeted manner and at the same time protect them from premature breakdown by influences such as gastric acid, enzymes or other adverse factors. The method includes production of the particles with a minimum possible size and subsequent coating of these particles with protective polymers.

The object according to the invention of producing the particles to be coated is achieved by a method for the preparation of suspensions of very fine particles, which is characterized in that a liquid stream of a particle-free liquid 1 containing the active compound in dissolved form is brought together with a second liquid stream of a liquid 2 in a high-energy zone or at the earliest 2 seconds before reaching the high-energy zone, wherein the two liquids are miscible with one another and the active compound dissolved in liquid 1 is insoluble or less soluble in liquid 2 and precipitates as particles in the or within a maximum of 2 seconds before reaching the high-energy zone on mixing of the two liquids.

The particles produced in this way by way of example are then introduced into an aqueous external phase which contains the coating or covering materials in dissolved form, and the mixture is then subjected to a drying step, as a result of which these materials precipitate on the particles as a closed coating. The particles enveloped in this way are protected from harmful influences and, in contrast to non-enveloped particles, have modified release kinetics.

The size-reducing process comprises dissolving of the active compound in a solvent, mixing of the solvent with a non-solvent and carrying out of a precipitation in a zone of high energy. Thereafter, the suspension obtained is subjected to a film coating process (coating process) with polymers or macromolecules. The film coating process can be used in particular for nanoparticles, but of course also for microparticles, without organic solvents having to be used. The process can be carried out in non-organic solvents, in particular in water or aqueous media.

The present invention opens up the possibility of obtaining very fine or ultrafine drug particles or polymer particles having an average diameter of less than 1,000 nm, preferably of less than 300 nm, particularly preferably of less than 200 nm and specifically of less than 100 nm down to approx. 5 to 10 nm. Various methods have been described to date for preparation of suspensions via precipitation, the size which can be achieved depending exclusively on the precipitation conditions (e.g. mixing rate, nature of the stabilizer) (see U.S. Pat. No. 5,389,382 and US-A-2005 0 139 144). It has also been described that the precipitated product can be treated in a second subsequent step after precipitation has been concluded. The precipitated product is treated with high energy in order to maintain the particle size achieved and to prevent further growth of the suspension such as occurs when the suspensions are stored for days (see US-A-2002 0 127 278). The same process can also be used to modify the crystalline character of the material, i.e. to convert amorphous or partly crystalline regions into completely crystalline material. In contrast to merely maintaining the particle size achieved by precipitation, this invention prevents a growth of the crystals during the precipitation process by expending energy. The method is used, not after the complete precipitation process, as described in US-A-2002 0 127 278, but already during the precipitation. Surprisingly, it has additionally been discovered that a prevention of the crystal growth leads to crystals which can be comminuted still further relatively easily by further expenditure of energy (Example 1).

Carrying out the precipitation in a zone of high energy requires a particular design of the apparatus. This design can also be achieved by a modification of already existing apparatuses, in that various modified parts are added in order to feed in the liquid phase which is processed in the high-energy zone.

The film coating process can be carried out in various ways. Either the desired polymers are already dissolved in the external phase before production of the particles, or particles of the desired size are first produced, in order for these then to be dispersed in a polymer solution and thereafter for a film formation to be achieved by withdrawal of the solvent or modification of the properties of the solvent. The withdrawal of the solvent or the film formation can be carried out by spray drying, evaporation methods, solvent diffusion methods, lyophilization or in the course of the use of further processes, such as, for example, fluidized bed granulation or suspension spray application (suspension layering).

The aim of this invention was to develop a process for producing coated particles, in particular nanoparticles, which dissolve rapidly in order to transport these drugs to the intestinal tract and at the same time to protect them from the acidic pH of the stomach. The process includes, for example, production of nanoparticles with a minimum possible size and subsequent coating of these particles with protective polymers.

The size-reducing process comprises dissolving of the active compound in a solvent, mixing of the solvent with a non-solvent and carrying out a precipitation in a zone of high energy. Thereafter, the suspension obtained is subjected to a film coating process (coating process) with polymers or macromolecules. The film coating process can be used in particular for nanoparticles, but of course also for microparticles, without organic solvents having to be used.

The process can be carried out in non-organic solvents, in particular in water or aqueous media.

The present invention opens up the possibility of obtaining very fine or ultrafine drug particles or polymer particles having an average diameter of less than 1,000 nm, preferably of less than 300 nm, particularly preferably of less than 200 nm and specifically of less than 100 nm down to approx. 5 to 10 nm.

Various methods have been described to date for preparation of suspensions via precipitation, the size which can be achieved depending exclusively on the precipitation conditions (e.g. mixing rate, nature of the stabilizer) (see U.S. Pat. No. 5,389,382, US-A-2005 0 139 144). It has also been described that the precipitated product can be treated in a second subsequent step after precipitation has been concluded. The precipitated product is treated with high energy in order to maintain the particle size achieved and to prevent further growth of the suspension such as occurs when the suspensions are stored for days (US-A-2002 0 127 278). The same process can also be used to modify the crystalline character of the material, i.e. to convert amorphous or partly crystalline regions into completely crystalline material. In contrast to merely maintaining the particle size achieved by precipitation, this invention prevents a growth of the crystals during the precipitation process by expending energy. The method is used, not after the complete precipitation process, as described in (US-A-2002 0 127 278), but already during the precipitation. Surprisingly, it has additionally been discovered that a prevention of the crystal growth leads to crystals which can be comminuted still further relatively easily by further expenditure of energy (Example 1).

Carrying out the precipitation in a zone of high energy requires a particular design of the apparatus. This design can also be achieved by a modification of already existing apparatuses, in that various modified parts are added in order to feed in the liquid phase which is processed in the high-energy zone.

The film coating process can be carried out in various ways. Either the desired polymers are already dissolved in the external phase before production of the particles, or particles of the desired size are first produced, in order for these then to be dispersed in a polymer solution and thereafter for a film formation to be achieved by withdrawal of the solvent or modification of the properties of the solvent. The withdrawal of the solvent or the film formation can be carried out by spray drying, evaporation methods, solvent diffusion methods, lyophilization or in the course of the use of further processes, such as, for example, fluidized bed granulation or suspension spray application (suspension layering).

DETAILED DESCRIPTION OF THE INVENTION

Figure 1:
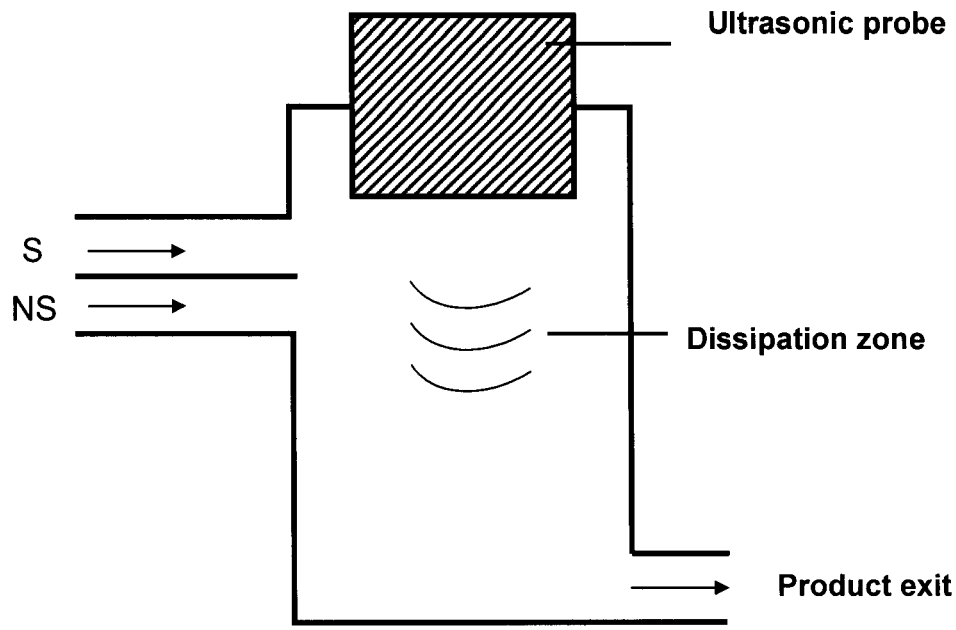
FIGS. 1A and 1B illustrate exemplary ultrasonic probes.
Figure 1:
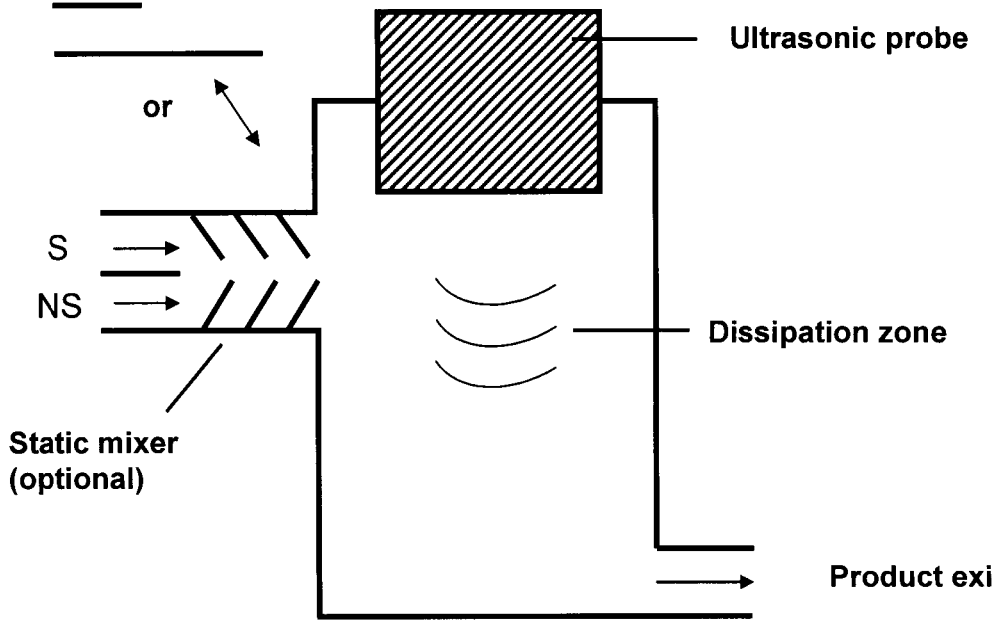

A precipitation step carried out in the conventional manner leads within 1 to 10 seconds to a product having an average particle diameter in the size range of from approx. 500 nm to a few micrometers, and crystal growth typically rapidly leads to a precipitate in the micrometer range. Processing of this material by means of high pressure homogenization can preserve the precipitated particle size and prevent further crystal growth, but does not substantially reduce the particle size (US-A-2002 0 127 278). It is therefore particularly important that in the present invention the comminution process starts immediately or within milliseconds to seconds after the crystallization process. In this phase the particles are still in the lower nanometer range (e.g. below 500 nm). In addition, it can be assumed that the orientation method of the molecules which form the crystal is not yet concluded completely, since the crystallization has just begun.

Just as in the case of lipids, arrangement of the molecules requires time for an optimized arrangement within the crystal structure. In the case of lipids, such as e.g. adeps solidus (hard fat), it takes approximately 6 seconds to arrive at the more ordered beta modification from the alpha modification. Apart from highly purified fats, fats are chemically inhomogeneous, that is to say they are composed of very different molecules. These molecules of spatially different structure require more time to orientate themselves compared with chemically uniform compounds. This can be compared to the construction of a wall from uniform bricks, which can be constructed relatively rapidly compared with a wall of very different stones. The conclusion drawn from this theoretical consideration is that the crystal formation process of a chemically uniform drug should proceed very rapidly. Surprisingly, it has been found that precipitation in the range of high energy or followed by the immediate expenditure of high energy (e.g. above the power density of $10^5$ W/m$^3$) leads to prednisolone nanocrystals having an average diameter of 133.6 nm (determined by photon correlation spectroscopy (PCS)) (Example 2). The achievement of such a size using the high pressure homogenization technique has not yet been reported to date.

The suspension obtained by this procedure was processed further under the action of further energy. Circulation of the suspension up to a total time of 5 minutes in the homogenizer led to a PCS diameter of 26.6 nm. Surprisingly, the structure of the particles which were precipitated out under the influence of high energy appears to be transformed into a more fragile form. The particle diameter decreased here to a size (Example 3) which as yet has never been reported for a high pressure homogenization process corresponding to U.S. Pat. No. 5,091,187 or U.S. Pat. No. 5,858,410.

According to the Kelvin equation, the vapour pressure of drops of liquid in a gas phase increases with increasing curvature of the drops, i.e. with decreasing drop size. Equivalent to this, the solution pressure of solid particles in a liquid increases with decreasing particle size, i.e. the saturation solubility increases (K. Peters, Dissertation, FU Berlin, 1999). Model calculations have been performed for the increase in the vapour/solution pressure as a function of the size of the spherical drops/particles (S. Anger, Dissertation, FU Berlin, 2004). An exponential relationship was obtained here. The calculations showed no or only a very small increase for sizes of about 1 μm. However, a remarkable increase was found when the size was reduced from 1 μm (1,000 nm) to 100 nm. Due to the exponential character of the relationship between size and solution pressure, a significant increase in the solution pressure was found at particle sizes below 100 nm, which was particularly pronounced below 50 nm, and an extremely high increase was found at particle sizes of below 25 nm. On the basis of this, the saturation solubility will have a particularly pronounced increase if the size is below 50 nm. In Example 4 the prednisolone particles were homogenized in the continuous process for 10 minutes. After 6 minutes the PCS diameter was 22.1 nm, after 7 minutes 21.4 nm, and after 8 minutes the nanocrystals were dissolved and a clear solution was obtained. This highly supersaturated solution was stable for approximately 1 hour before precipitation with the formation of large crystals occurred.

A similar effect was observed in the precipitation of budesonide, which led to the formation of crystals having a diameter of LD 50% of 7.339 μm (volume distribution, determined by laser diffractometry, LD) (Example 5). The precipitation according to the invention using the jet stream principle (corresponding to the construction in FIG. 2) led to an LD 50% of 1.858 μm (Example 6). If the jet stream construction is used (FIG. 2), the time between the start of the precipitation and the expenditure of energy on the crystals is extremely short. In order to investigate the effect of the time delay between the start of the crystallization and the introduction of energy an experiment was carried out with a piston-gap homogenizer. The use of the piston-gap homogenizer led to a size of LD 50% of 2.651 μm. In this case the delay between the start of the precipitation and the expenditure of energy was 2 seconds. It can be concluded from this: In order to obtain very small particles, the time between the start of the formation of crystals and the expenditure of energy should be much shorter than 2 seconds.

In order to be able to subject the crystallizing particles to a comminuting force immediately, it is necessary for the precipitation to take place directly in the dissipation zone of the energy-supplying apparatus, e.g. ultrasonic probe (FIG. 1), of the homogenizer (FIGS. 2-4) or of a rotor-stator colloid mill. Alternatively, the particles can be brought to the dissipation zone (e.g. gap in a piston-gap homogenizer) within 1 to 100 milliseconds, 100 to 500 milliseconds or 1 to 2 seconds, but at the latest within 1 minute. If a "matured" precipitate is exposed to a homogenization process, in contrast to the use of the inventive method no such fine product is obtained (Example 7). For this reason the time delay between the start of the precipitation and the introduction of energy should not be too long.

Depending on the speed of the in situ formation of particles during the precipitation operation, it may be more advantageous either to precipitate the particles directly in the homogenization zone or to bring the particles into the homogenization zone with a short delay, so that at least the formation of the core is concluded. Further precipitation and crystal growth could otherwise occur if the particles have already left the homogenization zone. In order to be able to control the delay time between the start of the crystallization and the homogenization, a device has been developed with which the required delay can be established via the pumping speed and a variable distance between the "site of mixing" and "the zone of introduction of power", to obtain the desired target size of the crystals. It is not desirable to generate the smallest possible crystals in every case.

Figure 2:
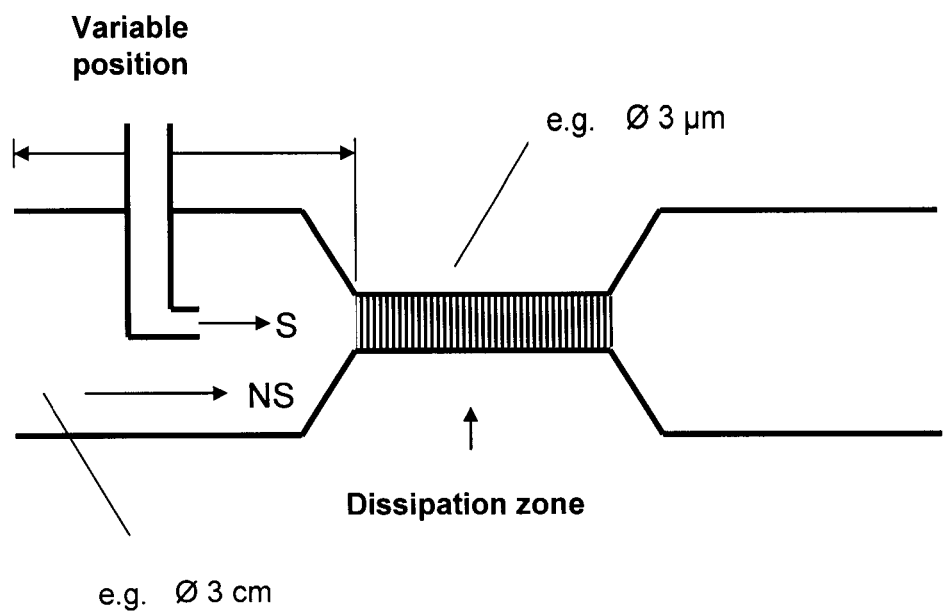
FIG. 2 illustrates an exemplary piston-gap homogenizer.
Figure 4:
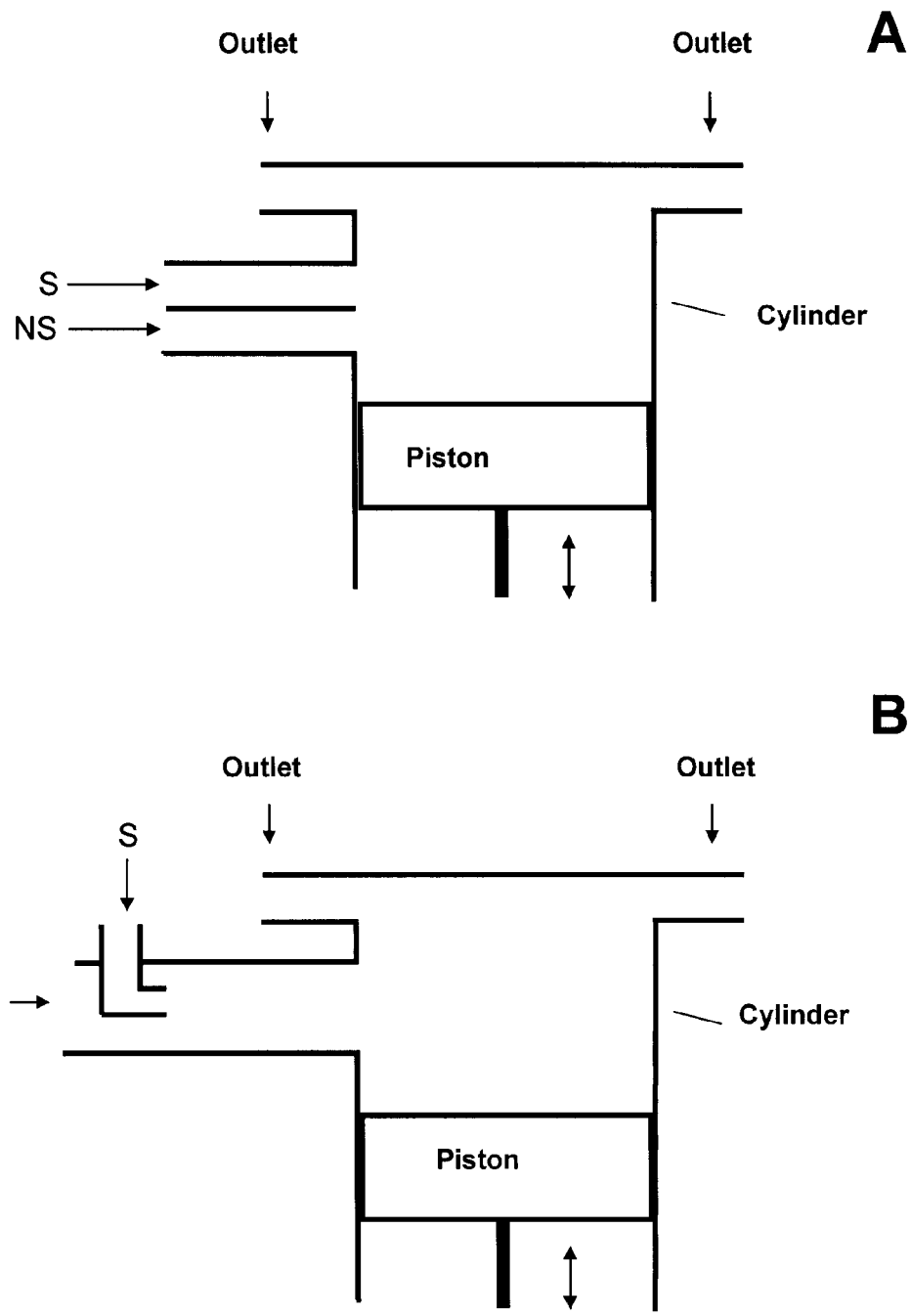
FIGS. 4A and B illustrate exemplary piston-gap homogenizers.
Figure 5:
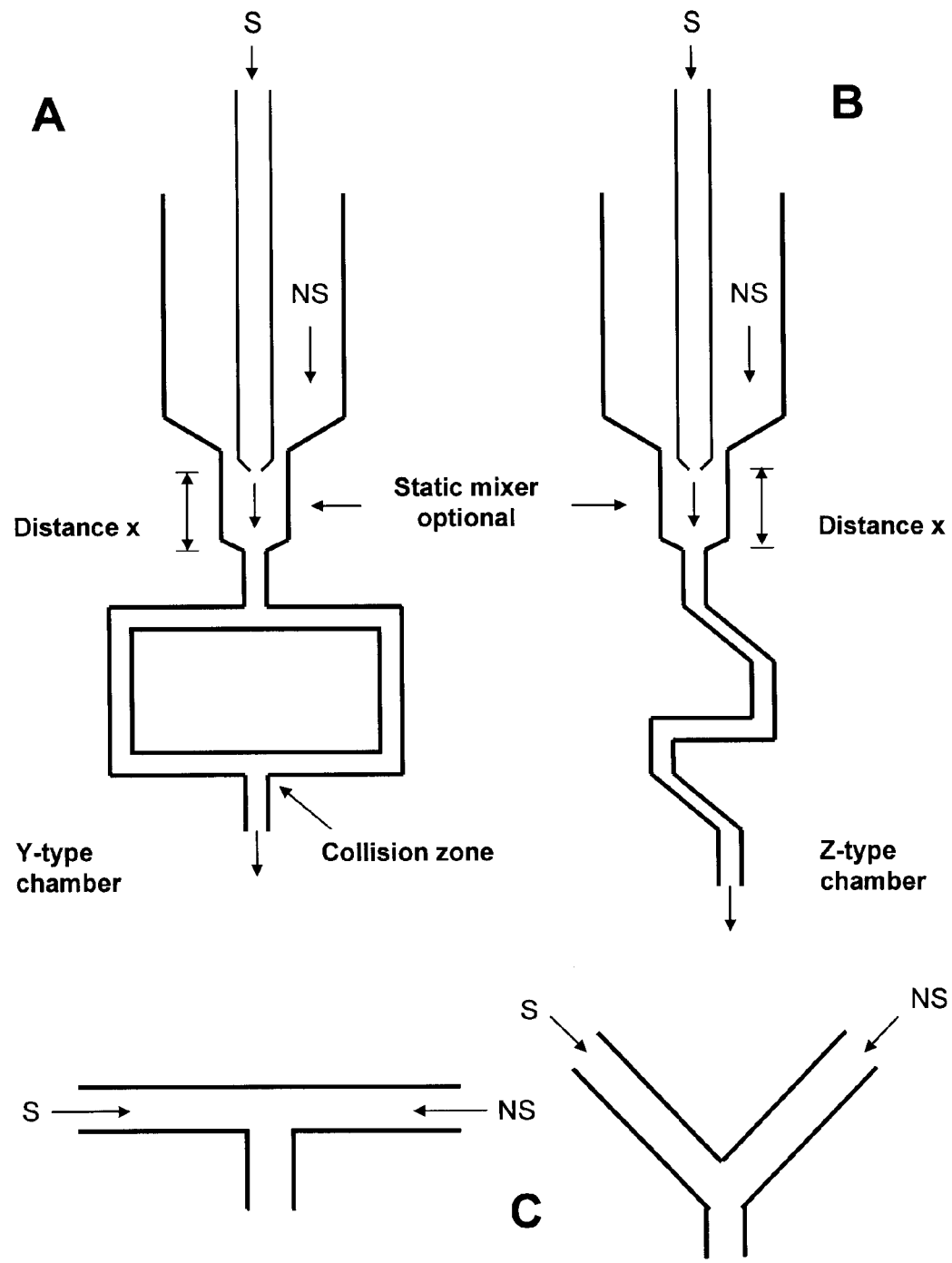
FIGS. 5A-C illustrate exemplary jet stream homogenizers.
Figure 6:
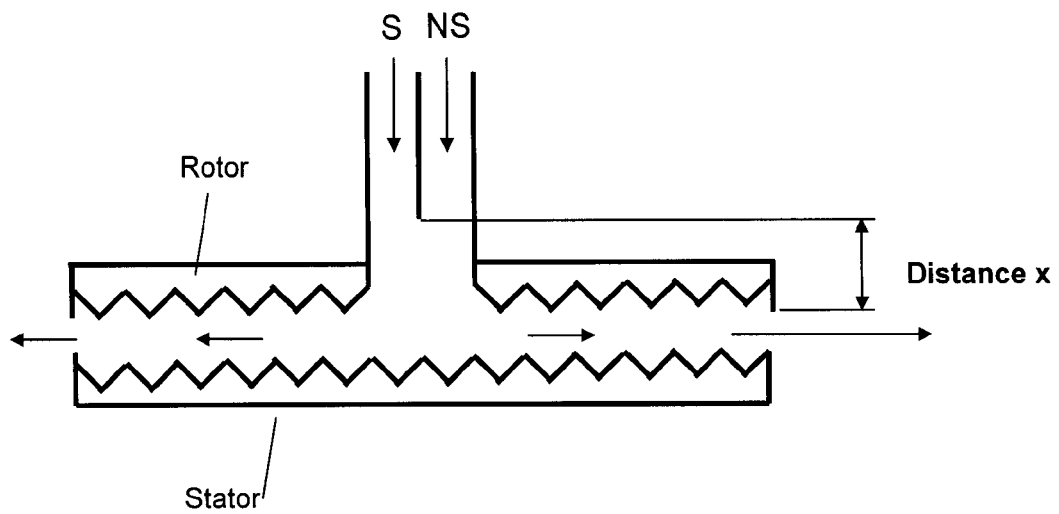
FIG. 6 illustrates an exemplary rotor-stator construction.

In order to achieve this, specific homogenization chambers have been designed for this process (FIGS. 1 and 3, FIG. 2 shows the principle), or alternatively the arrangement of a commercially available homogenization unit has been modified. (FIG. 4 to 6).

FIG. 1: Tubes with the solvent (S) and the non-solvent (NS) are arranged parallel such that the liquid streams of solvent and non-solvent flow parallel to one another and mixing of the first with the second jet is minimized. The two jets reach the dissipation zone below the probe of the ultrasonic apparatus. The two liquids mix below the vibration probe, as a result of which precipitation takes place directly in the zone of introduction of energy (FIG. 1A). In a second device variant the two liquids come into contact at a certain distance x from the dissipation zone, as a result of which first crystallization seeds form at the interface between the non-mixing or only slightly mixing streams of liquid (FIG. 1B). The streams are characterized in that they both flow in the same direction. Static mixers (various types) can optionally be incorporated, the direction of flow of the two streams again being possible only in one direction within the mixers.

FIG. 2 shows the process arrangement in principle with respect to the invention using piston-gap homogenizers based on the Bernoulli principle. The solvent liquid stream is aligned parallel to the non-solvent liquid stream within an area of low flow rate. The two streams of liquid aligned in parallel then reach a zone having a narrower diameter. The cavitation which occurs leads to a mixing of the liquids, as a result of which precipitation occurs. The particles formed are comminuted by cavitation forces while still in the state of formation. A second or repeated passage of these crystals can be utilized for further comminution of the crystals. By varying the tube with the solvent (S), the time between the start of particle formation and introduction of energy can be varied (analogously to FIG. 1B).

Figure 3A:
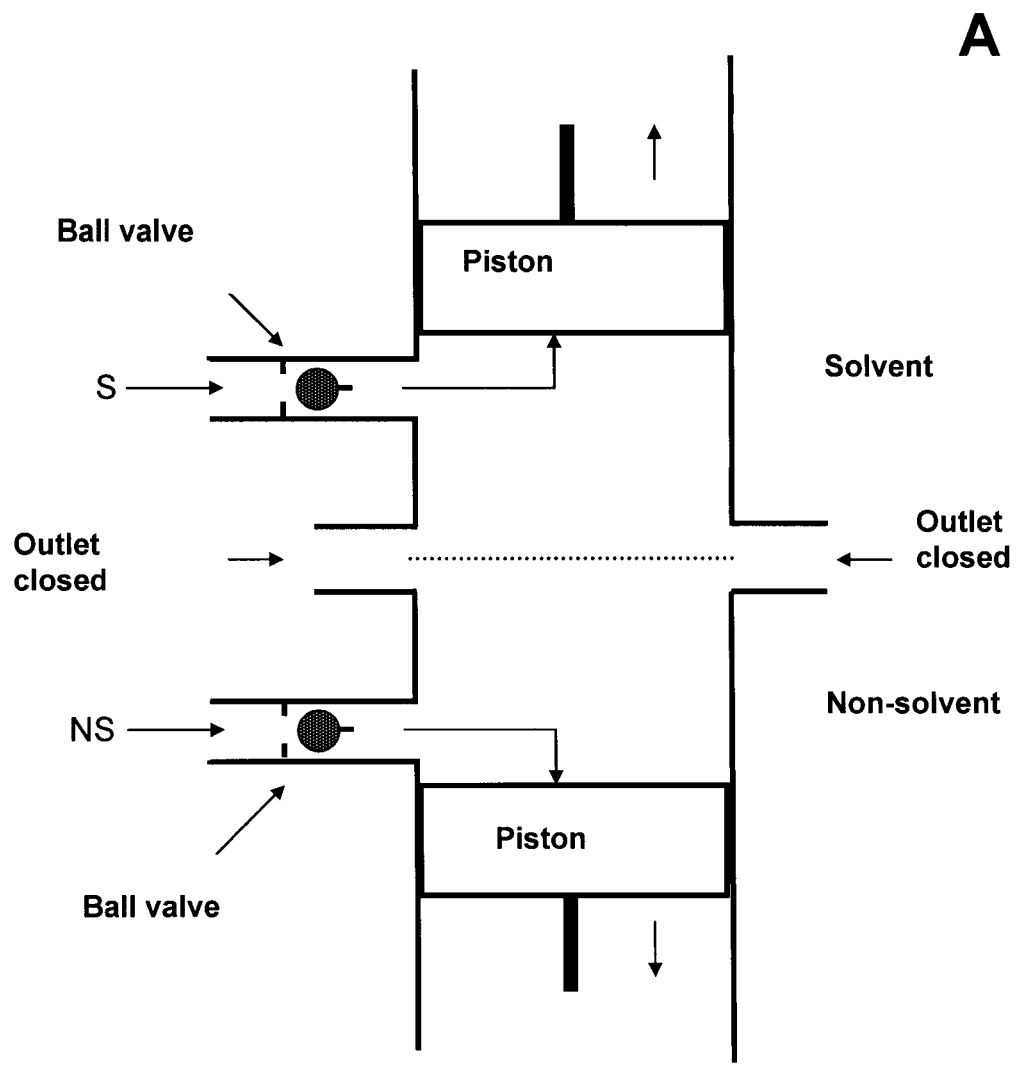
FIGS. 3A-C illustrate exemplary piston-gap homogenizers.
Figure 3B:
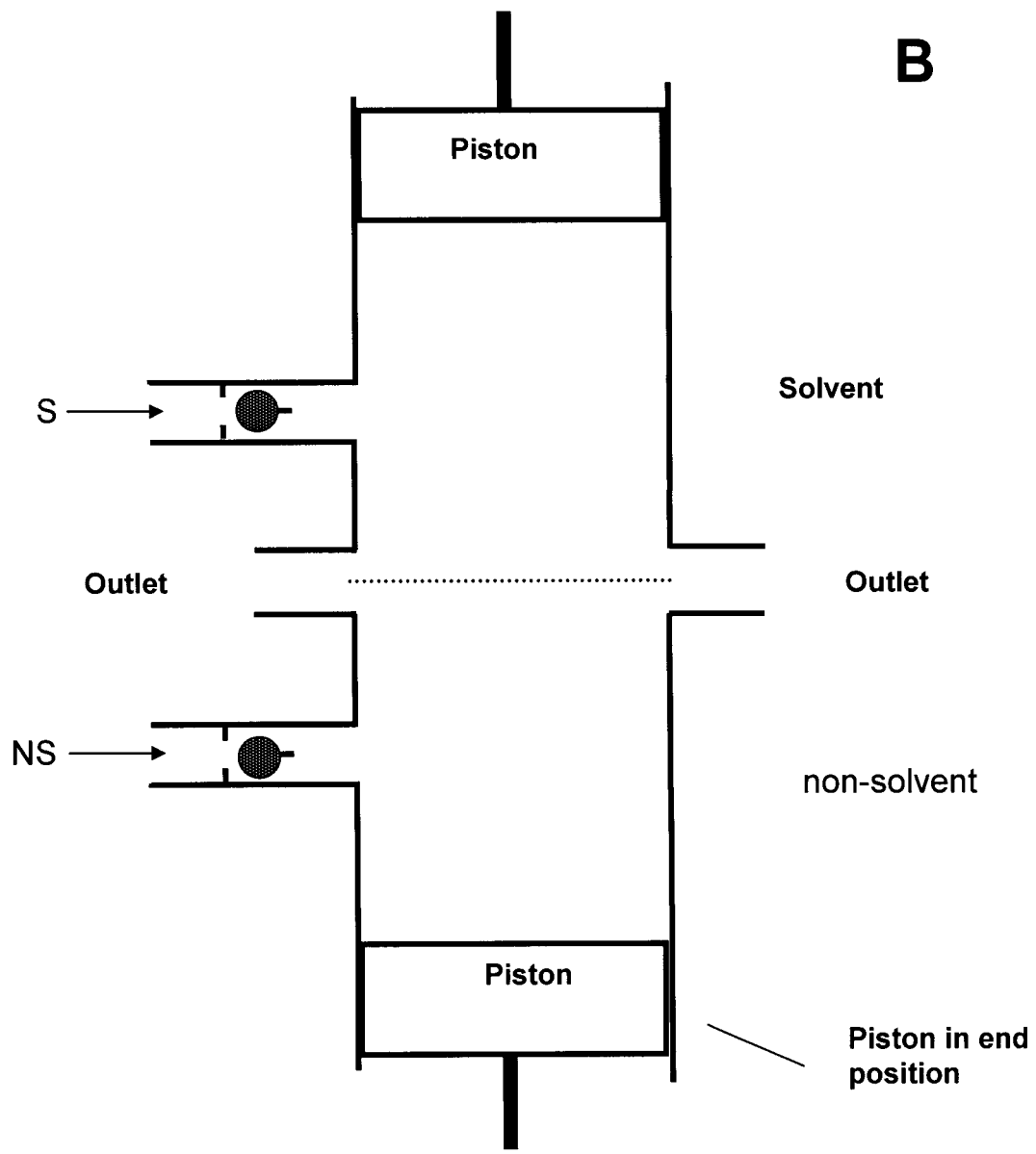
Figure 3C:
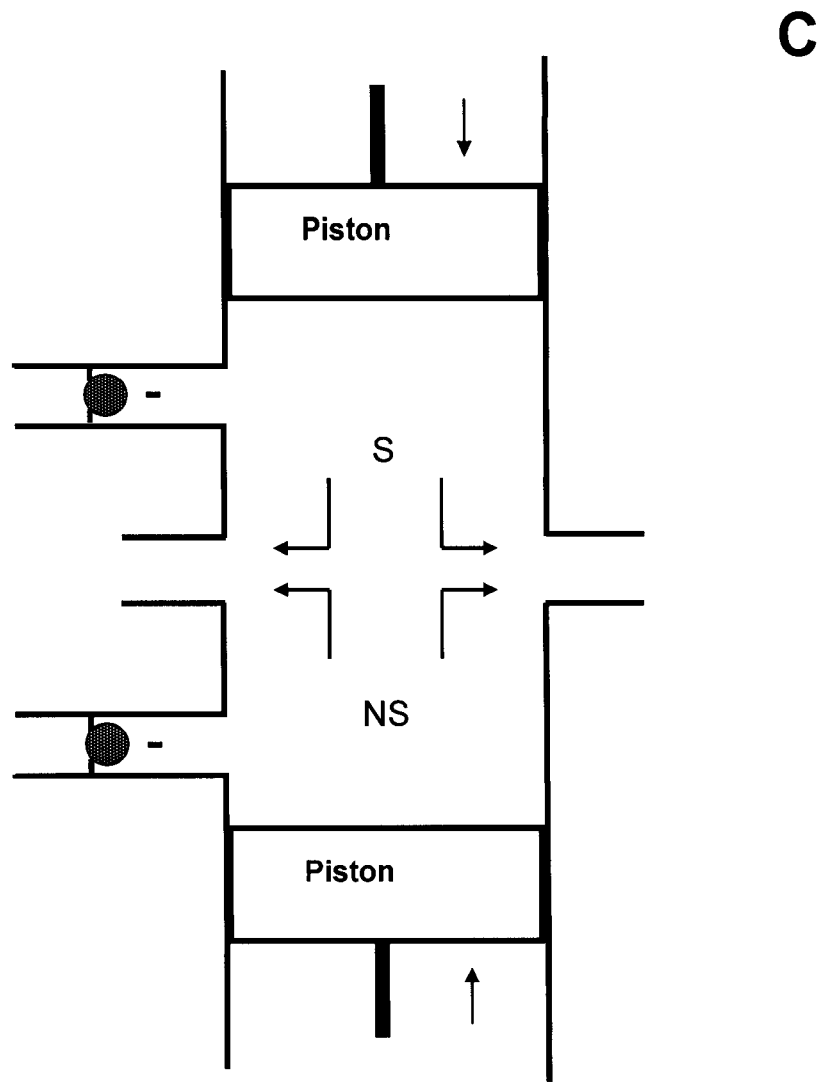

FIG. 3 shows the construction in principle of a double piston arrangement for a piston-gap homogenizer. Two pistons are located in a cylinder and move towards one another during the homogenization operation. In the first step the pistons move apart and thereby suck in the solvent and the non-solvent. In this context, the tubes of the liquid streams are positioned such that parallel movement of the liquid streams in one direction is ensured and mixing is minimized (FIG. 3A). After filling of the cylinder, the pistons are furthest removed from one another (FIG. 3B). During the homogenization step the two pistons move towards one another and thereby force the solvent stream (S) and the non-solvent stream (NS) in a parallel direction of flow through the annular homogenization gap (FIG. 3C).

FIG. 4: Existing piston-gap homogenizers can be used to apply the method of the invention after small modifications (e.g. the continuous variant of Micron LAB 40, APV Homogenizer Systems, Unna, Germany). The intake of the one-piston homogenizer is modified such that the two parallel tubes of the solvent (S) and non-solvent stream (NS) flow in parallel into the cylinder during the filling process when the piston moves downwards (FIG. 4A). A ball valve closes the two intake tubes when the piston moves upwards during the homogenization operation, in order to force the two liquids through the homogenization gap. Feeding in of S and NS can alternatively take place as shown in FIG. 4B (corresponding to FIG. 2).

FIG. 5 shows the construction in principle using jet stream homogenizers. A unit which renders possible parallel inflow of the solvent stream (S) and the non-solvent stream (NS) is included upstream of the homogenization chamber (e.g. Y type or Z type chamber in the Microfluidizer, Microfluidics Inc. USA). After the two liquid streams have met, they flow in a parallel direction through a tube of variable distance x. This length x can be varied in order to regulate the entry of the liquid streams into the dissipation zone with respect to time. If required, various types of static mixers can be used. The narrowing of the tubes in the homogenization chamber leads to an extremely high flow rate before the crystals meet in the collision zone.

FIG. 6: The liquid streams of solvent (S) and non-solvent (NS) are fed to a rotor-stator construction of a wet grinding colloid mill. In this context, the arrangement of the tubes renders possible a parallel entry of the two liquid streams. If desired—as in FIG. 1—the distance x can be modified, or static mixers can be incorporated. Mixing of the two liquid streams occurs between the two plates of the rotor and of the stator.

To avoid energy "impinging" on the particles just forming by precipitation in too early a phase, a delay can be incorporated in that mixing of the solvent and the non-solvent takes place with a delay of from one millisecond to a maximum of two minutes before the dissipation zone of the ultrasonic apparatus, of the homogenizer, of the colloid mill or of comparable comminution apparatuses is reached. The time of the delay of entry in the homogenization zone can be adapted by varying the flow rate of the liquid streams and by varying the distance x (e.g. FIG. 1B, 5, 6) before the dissipation zone is reached, the calculations here being based on the Hagen-Poiseuille law and the Bernoulli equation.

The Lab-Scale Microfluidizer HC-2000 (Microfluidics Inc., USA) has been adapted for this process in that a hose with a 0.45 g cannula has been placed in the inflow reservoir in order to add the solvent liquid stream in a controlled manner. The pumping rate here was 10 ml/min. The non-solvent was added to the inflow reservoir (corresponding to FIG. 5, left).

The pumping speed of the liquids through the homogenizer was approx. 200 ml/min. On the intake side of the pump the flow rate of the product is up to 0.1 m/s for low-viscosity liquids (Müller, R. H., Böhm, B. (ed.), Dispersion Techniques for Laboratory and Industrial Scale Processing, Wissenschaftliche Verlagsgesellschaft Stuttgart, 113 S., 2001, p. 77). Taking into account the low viscosity of water and ethanol and the short distance between the reservoir and the pump, the liquids thus reach the pump after approximately less than 200 ms. According to the manufacturers of the apparatus, the diameter of the intake tube is relatively large in order to render possible the lowest possible flow resistance (Müller, R. H., Böhm, B. (ed.), Dispersion Techniques for Laboratory and Industrial Scale Processing, Wissenschaftliche Verlagsgesellschaft Stuttgart, 113 S., 2001, p. 77). By the modification of the apparatus in accordance with FIG. 5, the diameter can be reduced, and in addition the length of the intake tube can also be reduced (the reservoir is placed closer to the pump), as a result of which the inflow time is reduced to 20 ms or less. Alternatively, the reservoir tank can also be directly on the pump intake, as a result of which only a few milliseconds would be required. Once the liquids have left the pump, tubes of rustproof steel lead to an acceleration to up to 10 m/s. The liquids reach the dissipation zone within milliseconds.

This construction can also be utilized to precipitate particles directly in the collision zone (FIG. 5). In this case the solvent liquid stream, with the dissolved compound, or the compound and the non-solvent stream are led in parallel into the Z chamber of the Microfluidizer, the distance x being zero (FIG. 5, right, distance x=zero). Alternatively, the two streams of liquid can be led such that they meet one another directly in a modified Y chamber. The liquid stream is not divided before entry into the collision zone, but two liquid streams are led separately to the collision zone. The solvent stream collides with the non-solvent stream and mixes with this in the collision zone, it being possible for the two liquid streams to collide with one another either frontally or in an angled position, e.g. 900 or less, such as e.g. 45° (FIG. 5C).

For oral administration, the drug nanocrystals often require a polymer coating, especially if the drugs are acid-labile drugs which could be destroyed during unprotected passage through the stomach. Further reasons for polymer coatings are targeted administration of the drug (drug targeting) or a desired controlled release. So that the abovementioned advantageous properties of individual drug nanocrystals do not have to be dispensed with, the possibility of coating individual nanocrystals, as implemented in this patent, is particularly desirable.

In this context the use of organic solvents is undesirable for any process, whether for toxicological, ecological or economic reasons. For this reason a process has been developed in which the (nano)crystals prepared are preferably coated with polymers without the use of organic solvents.

Acidic polymers which are present in protonated form at the acidic pH of the stomach and are insoluble are often used for the preparation of enteric-coated drug forms. When the pH then increases on transition to the intestine, salts of these polymers form.

The deprotonated polymers have a better solubility and release the enclosed drug.

In order to apply these polymers to the medicament forms they are as a rule dissolved in organic solvents or used in the form of aqueous dispersions (O/W emulsions). Generally, the use of organic solvents is not advantageous, and in the specific case they cannot be used at all since many water-insoluble active compounds are in some cases even very readily soluble in organic solvents. Aqueous dispersions likewise cannot be used for coating nanocrystals since these on the one hand have too large a particle size/drop size compared with the drug nanocrystals and on the other hand often react in a very unstable manner during mixing.

For these reasons aqueous polymer solutions were used as the coating material in the present invention, the pH-dependent solubility of polymers having been utilized.

Aqueous solutions of enteric film-forming agents have already been known for a relatively long time (Bianchini, R., Resciniti, M., Vecchio, C. Technology evaluation of aqueous enteric coating systems with and without insoluble additives, Drug Dev Ind Pharm 17, 1779-1794, 1991; company information Röhm, Pharmapolymere, Magensaftresistente Überzüge, 2003). However, these polymer solutions have hitherto been employed only to coat conventional medicament forms, such as e.g. tablets and pellets, with an enteric film-forming agent. If conventional bases, such as sodium hydroxide or potassium hydroxide, are used, however, enteric properties can be achieved only by applying large amounts. This is not practicable technically for nanoparticles/nanocrystals (e.g. to high a dilution of the nanosuspension, which is difficult to concentrate again; reduction in the zeta potential by addition of electrolyte with subsequent aggregation of crystals). A solution approach, namely the use of volatile bases, such as ammonium bicarbonate, is described by Hasan Rafati in the patent GB2353215. However, this patent includes only the solution layering technique (specifically in the coating pan method) and also gives only examples for enteric-coated acetylsalicylic acid tablets.

In contrast, the present invention describes the use of aqueous polymer solutions both as the dispersion medium during the production of nanocrystals and for coating nanoparticles, specifically drug nanocrystals.

In principle, a distinction may be made between two versions in the coating of the drug nanocrystals. In the first version the particles to be coated are produced directly in the polymer solution. In this context either the methods described above can be used, or the drug nanocrystals can be produced by another method and manner. Possible methods are described, for example, in the patent of R. H. Müller et al. (WO 0103670) but without going into detail of a film coating process (coating) of individual nanocrystals.

In a further version of the patent, the drug nanocrystals are already produced before the addition to the polymer solution, and are dispersed in the polymer solution only subsequently in the form of a nanosuspension or a powder with the aid of mixing apparatuses of low power density (for example toothed disc mixer, blade stirrer).

The coated nanoparticles then have, depending on the method used and the starting size, a particle size in the range of from a few 100 nm up to 100 µm, preferably below 50 µm, ideally below 5 µm, the drug crystals having a particle size in the nanometer range.

Figure 7:
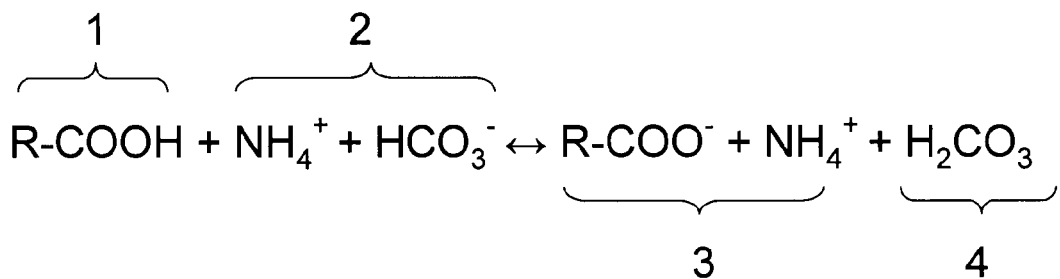
FIGS. 7a-c illustrate exemplary reactions.
Figure 7:
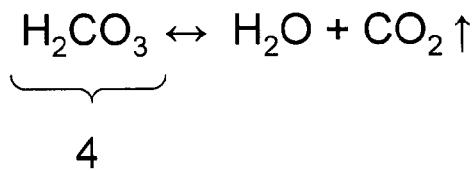
Figure 7:
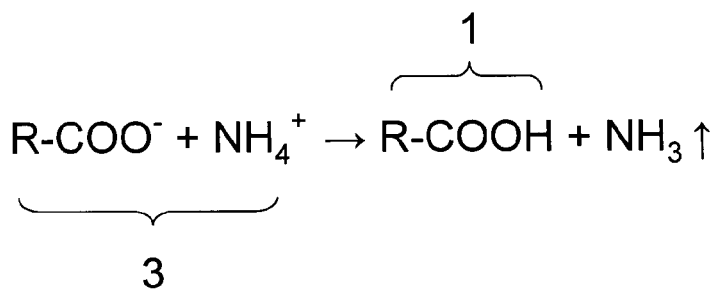

In the case of acidic polymers (for example polymethacrylates, cellulose acetate phthalate, hydroxypropylmethylcellulose phthalate, HPMCAS), an aqueous polymer solution is obtained, for example, by addition of sufficient amounts of volatile bases, such as e.g. ammonium bicarbonate. By addition of this base, the pH is shifted into a range in which the polymer is soluble (FIG. 7a). If ammonium bicarbonate is used as the base component, the ammonium salts of the acidic polymers and carbonic acid, which dissociates immediately into carbon dioxide and water (FIG. 7b), are formed by this means. A further advantage of the inventive method is that acid-sensitive drugs (such as, for example, omeprazole) are protected from chemical decomposition by dissolving the acidic polymer in aqueous basic solutions. In order to improve the film properties of the finished formulations, plasticizers (such as e.g. triethyl citrate, acetyl tributyl citrate, dibutyl sebacate, propylene glycol, inter alia) can additionally also be added to this polymer solution. The external phase can moreover also contain surfactants, stabilizers and other auxiliaries.

Typical surfactants or stabilizing substances which can be added to the solvent are e.g. compounds from the series of polyoxyethylene/polyoxypropylene block copolymers (poloxamers), ethylenediamine/polyethylene oxide/polypropylene oxide block polymers (poloxamines), ethoxylated mono- and diglycerides, ethoxylated lipids and lipiods, ethoxylated fatty alcohols and alkylphenols, ethoxylated fatty acid esters, polyglycerol ethers and esters, lecithins, esters and ethers of sugars or sugar alcohols with fatty acids or fatty alcohols, such as e.g. ethoxylated sorbitan fatty acid esters, in particular polysorbates (e.g. polysorbate 80 or Tween 80), polyglycerol methylglucose distearate (Tego Care 450), sorbitan fatty acid esters (e.g. Span 85), phospholipids and sphingolipids, sterols, esters or ethers thereof and mixtures of these compounds. In addition, egg lecithin, soya lecithin or hydrogenated lecithins, mixtures thereof or mixtures of one or both lecithins with one or more phospholipid components, cholesterol, cholesterol palmitate, stigmasterol or other sterols are also possible for addition to the solution.

Under certain circumstances it may be necessary to add further substances to the solution in order to influence the properties of the solution itself or the properties of the dry powder prepared from the solution. Possible substances for this are, inter alia: diacetyl phosphate, phosphatidyl-glycerol, saturated or unsaturated fatty acids, sodium cholate, peptisators or amino acids, and cellulose ethers and esters, polyvinyl derivatives, alginates, xanthans, pectins, polyacrylates, poloxamers and poloxamines, polyvinyl alcohol, polyvinylpyrrolidone or glucose, mannose, trehalose, mannitol and sorbitol, fructose, sodium citrate, sodium hydrogen phosphate, sodium dihydrogen phosphate, sodium chloride, potassium chloride or glycerol. If necessary, dyestuffs, either in dissolved form or in insoluble form as pigments, can also be added to the solvent.

After the particles to be coated have been produced or dispersed completely in the polymer solution, film formation around these particles can be initiated by increasing the temperature of the system or by various drying methods. In this context the film formation process can be realized in various ways.

One possible method is spray drying, in which the process temperature is to be chosen as a function of the heat sensitivity of the drug and the properties of the polymer. In the case of the thermolabile drug omeprazole, a product temperature of from 50 to 60° C. should not be exceeded.

During the spray drying process, the ammonium salt of the enteric polymer/macromolecule which is formed when the polymer dissolves dissociates into the free acid and ammonia and water, the ammonia formed evaporating immediately (FIG. 7c). The polymer separates out in the phase separation process and surrounds the nanoparticles with a polymer layer which has enteric properties without further heat treatment. Improved film properties can be achieved by addition of suitable plasticizers.

Examples of spray dryers which can be used are apparatuses from the companies Niro, Nubilosa, Caldyn, Büchi, APV, Trema etc.

In the case of active compounds which are not heat-sensitive, the base dispersion formed can be heated, while stirring, as a rule temperatures above 60° C. being preferred. Ammonia, carbon dioxide and water are formed here, ammonia and $CO_2$ escaping and the polymer separating out on the surface of the nanocrystals via phase separation due to the lowered pH. In an appropriate process procedure, individual encapsulated nanocrystals are formed. By addition of electrolytes, the process can also be controlled via lowering of the zeta potential such that encapsulated nanocrystals join together to form large aggregates. The latter may be advantageous during further processing (e.g. these particle aggregates are easier to separate off).

A further approach to film formation is the addition of acids to nanosuspensions if the active compounds to be encapsulated are sufficiently stable to acids for the process time and the polymers are employed, for example, to coat the drug nanocrystals only for an improved "drug targeting".

A further approach to film formation is the use of drying methods via emulsion processes. In this context, the base dispersion is dispersed as the internal phase in a non-aqueous phase by conventional dispersing methods (e.g. blade stirrers, rotor-stator systems, toothed discs, homogenization by high pressure, with the aid of ultrasound). A w/o system is formed, the water drops containing the nanoparticles and dissolved polymer. Water is withdrawn in the next step, which can take place in various ways, e.g.:
1. by direct use of a non-aqueous dispersion medium having a relatively good solubility for water (e.g. castor oil, 4% water-solubility)
2. evaporation in vacuo or by heating or a combination of both
3. by solvent displacement, i.e. admixing of a liquid to the external phase after preparation of the emulsion, the admixed liquid having a good solubility for water (e.g. acetone).

During withdrawal of the water polymer is deposited on the surface of the nanoparticles, the viscosity increases, as the temperature increases evaporation of ammonia and carbon dioxide occurs again and an enteric coating is formed. In the preferred version, the polymer particles obtained are characterized in that as a rule they have included more than one nanoparticle.

The base dispersion prepared can also be further processed directly in a granulation process. In principle the same process as in the evaporation methods proceeds, but with the difference that further inert auxiliaries from a conventional granulation process are also present (e.g. lactose crystals). Deposition on nanoparticles and lactose crystals takes place in parallel, so that a mixture of encapsulated nanoparticles and encapsulated auxiliaries is prepared.

The granules obtained can either be filled into capsules, or alternatively tablets can be pressed. A further possibility is filling into sachets, e.g. for redispersing in drinks for administration. Extrusion of the granules to matrix pellets is furthermore possible.

In a further version, the suspension with still dissolved polymer/macromolecule which is obtained after the homogenization is sprayed directly, after addition of plasticizer, on to e.g. sugar pellets (non-pareilles). During the drying process a solid polymer shell is formed, this containing firmly included nanoparticles. The drying process is carried out at temperatures above 60° C., so that ammonia and carbon dioxide escape again.

Due to the film formation of the polymer on the surface of the drug particles, the properties of the coated drug nanocrystals are changed significantly. Depending on the polymer used e.g. a delayed release, an increased mucoadhesiveness or also a protection of sensitive drugs from the influence of gastric juice can be achieved. Needless to say, for enteric properties it is necessary for the base used for adjustment of the pH to be volatile under the process conditions, i.e. not to be present, for example, in the dry form in the end product.

If non-volatile bases are used, such as e.g. sodium hydroxide, precipitation of the acidic polymers occurs only after contact with acid, and as a result acid can initially penetrate and damage the sensitive drug. If volatile bases are used, such as e.g. ammonium bicarbonate, the base content escapes completely during the drying process since the ammonium salts of the acidic polymers liberate ammonia and are then present in the protonated, i.e. acid-insoluble form again. The polymer films formed are therefore already solid and acid-resistant before the action of an acid (FIG. 7b).

EXAMPLES

Example 1

Prednisolone was precipitated in the conventional manner, that is to say by addition of a solvent to a non-solvent. 275 mg of prednisolone were dissolved in 10 ml of 90% (v/v) ethanol and this solution was poured into 90 ml of distilled water, while stirring with a magnetic stirrer. Determination of the particle size directly after the precipitation gave a diameter LD 50% of 2.185 µm, LD 95% of 5.108 µm, LD 99% of 6.414 µm and a diameter of LD 100% of 8.944 µm (volume distribution, laser diffractometry, Coulter LS 230, Beckman-Coulter, USA).

Example 2

Prednisolone was dissolved in 10 ml of 90% (v/v) ethanol analogously to Example 1. 10 ml of this prednisolone solution were then pumped with the aid of an infuser (Braun Melsungen, Germany) into an apparatus which is described in FIG. 2. The pumping rate was 1.5 ml/min. The volume of the aqueous phase was 90 ml, exactly as in Example, in order to compare the conventional precipitation with the inventive method. After an infusion time of one minute a sample of the precipitated product was taken and with the aid of photon correlation spectroscopy (Zetasizer 4, Malvern, United Kingdom). The average particle diameter (z-average) was 113 nm, the polydispersity index (PI) was 0.678.

Example 3

A precipitation was carried out analogously to Example 2, and after 5 minutes a sample of the precipitated product was taken and analyzed with the aid of photon correlation spectroscopy. The average particle diameter (z-average) was 27 nm at a polydispersity index (PI) of 0.460.

Example 4

A precipitation was carried out analogously to Example 2, the homogenization time being 10 min. After 6 minutes a sample of the precipitate was taken and analyzed with the aid of photon correlation spectroscopy. The average particle diameter (z-average) was 22 nm at a polydispersity index (PI) of 0.854. A sample taken after 7 minutes had a PCS diameter of 22 nm at a PI of 0.441. After 8 minutes the prednisolone crystals dissolved due to the increased solution pressure at this small size. The milky suspension changed into a clear solution. After one hour the highly supersaturated solution started to crystallize out in the form of long, macroscopically visible needles.

Example 5

Budesonide was precipitated in the conventional manner by addition of a solvent to a non-solvent. For this, 275 mg of budesonide were dissolved in 10 ml of 90% (v/v) ethanol and this solution was poured into 90 ml of distilled water, while stirring with a magnetic stirrer. Determination of the particle size directly after the precipitation gave a diameter LD 50% of 7.339 µm and LD 90% of 10.920 µm (volume distribution, laser diffractometry, Coulter LS 230, Beckman-Coulter, USA).

Example 6

Budesonide was dissolved in 10 ml of 90% (v/v) ethanol analogously to Example 1. 10 ml of this prednisolon solution were then pumped with the aid of an infuser (Braun Melsungen, Germany) into an apparatus which is described in FIG. 2. The volume of the aqueous phase was 90 ml, exactly as in Example, in order to compare the conventional precipitation with the inventive method. After a circulation time of 10 minutes a sample of the precipitated product was taken and analyzed with the aid of laser diffractometry. Determination of the particle size gave a diameter LD 50% of 1.858 µm and LD 90% of 3.486 µm (volume distribution, laser diffractometry, Coulter LS 230, Beckman-Coulter, USA).

Example 7

An ethanolic budesonide solution corresponding to Example 6 was prepared, and a portion of this solution was added to distilled water, which was directly in the reservoir tank of a Micron LAB 40 (APV Homogenizer Systems, Unna, Germany). The budesonide precipitated out and 2 seconds after the precipitation energy was expended in the form of a homogenization step in order to investigate the effect of a delayed use of energy. A homogenization cycle was carried out under 1,500 bar. The diameter, determined by laser diffractometry, was LD 50% 2.651 µm and LD 90% 5.693 µm (volume distribution, laser diffractometry, Coulter LS 230, Beckman-Coulter, USA).

Example 8

The precipitation product prepared for Example 5 was subjected to a jet stream method, the homogenization taking place as described in Example 6. An LD 50% of 2.157 µm was measured as the particle size. If the inventive method is used, as described in Example 6, 1.858 µm is obtained.

Example 9

The pharmaceutical active compound hydrocortisone acetate was comminuted according to the invention in an aqueous polymer solution by high pressure homogenization. For this, 1.0 g of ammonium bicarbonate was first added to 92.0 g of water and 5.0 g of hydroxypropylmethylcellulose phthalate 55 (HPMCP 55) were dissolved in this solution. A liberation of carbon dioxide thereby occurred. The pH of the resulting polymer solution was then adjusted to 7.5 by further addition of ammonium bicarbonate. 1 g of poloxamer 188 was dissolved in this solution and 1.0 g of micronized hydrocortisone acetate was dispersed with an Ultra-Turrax (Janke & Kunkel, Germany) at 9,500 revolutions per minute. The mixture was then homogenized with a Micron LAB 40 high pressure homogenizer (APV Homogenisers, Unna, Germany). At the start 2 cycles were carried out under 150 bar, then 2 cycles under 500 bar and further homogenization was subsequently carried out under 1,500 bar. After 20 homogenization cycles at room temperature (RT) under a pressure of 1,500 bar, an average particle diameter of 951 nm and a polydispersity index (PI) of 0.216 were obtained with the aid of photon correlation spectroscopy (PCS).

Example 10

The pharmaceutical active compound hydrocortisone acetate was comminuted according to the invention in an aqueous polymer solution by high pressure homogenization.

For this, 2.5 g of ammonium bicarbonate were first added to 91.5 g of water and 4.0 g of Eudragit S 100 (pulverulent) were dissolved in this solution. A liberation of carbon dioxide thereby occurred. The pH of the resulting polymer solution was then adjusted to 7.5 by further addition of ammonium bicarbonate. 1.0 g of poloxamer 188 was dissolved in this solution and 1.0 g of micronized hydrocortisone acetate was dispersed with an Ultra-Turrax (Janke & Kunkel, Germany) at 9,500 revolutions per minute. The mixture was then homogenized with a Micron LAB 40 high pressure homogenizer (APV Homogenisers, Unna, Germany). At the start 2 cycles were carried out under 150 bar, then 2 cycles under 500 bar and further homogenization was subsequently carried out under 1,500 bar. After 20 homogenization cycles at room temperature (RT) under a pressure of 1,500 bar, an average particle diameter of 787 nm and a polydispersity index (PI) of 0.273 were obtained with the aid of photon correlation spectroscopy (PCS).

Example 11

The pharmaceutical active compound omeprazole was likewise comminuted according to the invention in an aqueous polymer solution by high pressure homogenization. For this, 1.0 g of ammonium bicarbonate was first added to 92.0 g of water and 5.0 g of hydroxypropylmethylcellulose phthalate 55 (HPMCP 55) were dissolved in this solution. A liberation of carbon dioxide thereby occurred. The pH of the resulting polymer solution was then adjusted to 7.5 by further addition of ammonium bicarbonate. 1.0 g of poloxamer 188 was dissolved in this solution and 1.0 g of micronized omeprazole was dispersed with an Ultra-Turrax (Janke & Kunkel, Germany) at 9,500 revolutions per minute. The mixture was then homogenized with a Micron LAB 40 high pressure homogenizer (APV Homogenisers, Unna, Germany). At the start 2 cycles were carried out under 150 bar, then 2 cycles under 500 bar and further homogenization was subsequently carried out under 1,500 bar. After 20 homogenization cycles at 5° C. under a pressure of 1,500 bar, an average particle diameter of 945 nm and a polydispersity index (PI) of 0.289 were obtained with the aid of photon correlation spectroscopy (PCS).

Example 12

The pharmaceutical active compound omeprazole was likewise comminuted according to the invention in an aqueous polymer solution by high pressure homogenization. For this, 2.5 g of ammonium bicarbonate were first added to 91.5 g of water and 4.0 g of Eudragit S 100 (pulverulent) were dissolved in this solution. A liberation of carbon dioxide thereby occurred. The pH of the resulting polymer solution was then adjusted to 7.5 by further addition of ammonium bicarbonate. 1.0 g of poloxamer 188 was dissolved in this solution and 1.0 g of micronized omeprazole was dispersed with an Ultra-Turrax (Janke & Kunkel, Germany) at 9,500 revolutions per minute. The mixture was then homogenized with a Micron LAB 40 high pressure homogenizer (APV Homogenisers, Unna, Germany). At the start 2 cycles were carried out under 150 bar, then 2 cycles under 500 bar and further homogenization was subsequently carried out under 1,500 bar. After 20 homogenization cycles at 5° C. under a pressure of 1,500 bar, an average particle diameter of 921 nm and a polydispersity index (PI) of 0.370 were obtained with the aid of photon correlation spectroscopy (PCS).

Example 13

The suspension prepared for Example 9 was then spray dried with a Mini Spray Dryer, model 190 spray dryer (Büchi, Switzerland). The spray drying conditions were: volume flow 700 l/min, pump setting 5, aspiration 8, heating rate: 5, inlet temperature: 120° C., outlet temperature: 55 to 60° C. The powder obtained in this manner was then examined under a light microscope. A uniformly round appearance, only few aggregates and a particle size in the range of from 1 to 5 μm was found at 1,000-fold magnification. Macroscopically, the product is a white, loose powder with good flowability.

Example 14

The powder prepared in Example 13 was subjected to a release test in order to demonstrate the reduced release in an acidic medium. For this, the powder was first stirred at 50 revolutions per minute in 750 ml of 0.1 N HCl for one hour at 37° C. and samples were taken with the aid of a 0.2 μm filter syringe at suitable intervals of time. The drug content was then determined with the aid of an HPLC installation. Only 20% of the total drug content was released within the first hour. A further 250 ml of phosphate buffer were then added to the release medium and the pH was therefore increased to pH 6.8. This increase in pH resulted in the intended dissolution of the enteric polymer. The total residual content of drug was released within 30 minutes after addition of the phosphate buffer.

The invention claimed is:

1. A method for preparation of suspensions of particles comprising:
combining a first liquid stream of a particle-free first liquid containing an active compound in dissolved form with a second liquid stream of a second liquid in a high-energy zone or at earliest seconds before reaching the high-energy zone, wherein the first and second liquids are miscible with one another and the active compound dissolved in first liquid is insoluble or less soluble in the second liquid and precipitates as particles in the high-energy zone or within a maximum of 2 seconds before reaching the high-energy zone from mixing of the first and second liquids, wherein the high-energy zone is a gap of a high pressure homogenizer or a collision zone of a high pressure homogenizer, and wherein average particle sizes (laser diffractometry, diameter 50%) smaller than 1 μm are obtained, and wherein the two liquid streams are arranged parallel to one another and do not mix with one another before reaching the high-energy zone, or wherein the two liquid streams are initially arranged parallel to one another and flow over a distance x in contact with and parallel to one another before reaching the high-energy zone.

2. The method according 1, wherein the high-energy zone is a Y chamber or a Z chamber of a jet stream homogenizer.

3. The method according to claim 1, wherein the first and second liquid streams are arranged parallel to one another and do not mix with one another before reaching the high-energy zone.

4. The method according to claim 1, wherein the first and second liquid streams are initially arranged parallel to one another and flow over a distance x in contact with and parallel to one another before reaching the high-energy zone.

5. The method according to claim 4, wherein the first and second liquid streams are initially arranged parallel to one another, flow over a distance x in contact with and parallel to one another before reaching the high-energy zone and are mixed with a static mixer before reaching the high-energy zone.

6. The method according to claim 4, wherein a delay time before the first and second liquid streams reach the high-energy zone is prolonged in a range of from 1 to 100 ms by varying the distance x.

7. The method according to claim 4, wherein a delay time before the first and second liquid streams reach the high-energy zone is prolonged in a range of from 100 up to 500 ms by varying the distance x.

8. The method according to claim 4, wherein a delay time before the first and second liquid streams reach the high-energy zone is prolonged in a range of up to 1 second by varying the distance x.

9. The method according to claim 4, wherein a delay time before the first and second liquid streams reach the high-energy zone is prolonged in a range of up to 2 seconds by varying the distance x.

10. The method according to claim 1, wherein average particle sizes (laser diffractometry, diameter 50%) which are smaller than 0.2 μm are obtained.

11. The method according to claim 1, wherein average particle sizes (photon correlation spectroscopy (PCS), z-average) which are smaller than 500 nm are obtained.

12. The method according to claim 1, wherein average particle sizes (photon correlation spectroscopy (PCS), z-average) which are smaller than 200 nm are obtained.

13. The method according to claim 1, wherein average particle sizes (photon correlation spectroscopy (PCS), z-average) which are smaller than 120 nm are obtained.

14. The method according to claim 1, wherein average particle sizes (photon correlation spectroscopy (PCS), z-average) which are smaller than 50 to 80 nm are obtained.

15. The method according to claim 1, wherein the first liquid stream of the particle-free first liquid is combined with the second liquid stream in the high-energy zone or at the earliest 2 seconds before reaching the high-energy zone.

16. A method for preparation of suspensions of particles comprising:
    combining a first liquid stream of a particle-free first liquid containing an active compound in dissolved form with a second liquid stream of a second liquid in a high-energy zone or before reaching the high-energy zone to form a mixture, wherein the first and second liquids are miscible with one another and the active compound dissolved in first liquid is insoluble or less soluble in the second liquid, wherein upon mixing of the first and second liquids a precipitation process is initiated in which the active compound precipitates as particles in the mixture, and wherein the high-energy zone is a gap of a high pressure homogenizer or a collision zone of a high pressure homogenizer; and
    starting homogenzing the mixture containing the particles before completion of the precipitation process and when a desired average particle size has been obtained in the mixture to prevent further size growth of the particles during the precipitation process and to produce particles having an average particle size (laser diffractometry, diameter 50%) smaller than 1 μm, and wherein the two liquid streams are arranged parallel to one another and do not mix with one another before reaching the high-energy zone, or wherein the two liquid streams are initially arranged parallel to one another and flow over a distance x in contact with and parallel to one another before reaching the high-energy zone.

17. The method according to claim 16, wherein the homogenization is conducted when the average particle size has reached 500 nm during the precipitation process.

18. The method according to claim 16, wherein the first and second liquid streams are initially arranged parallel to one another and flow over a distance x in contact with and parallel to one another before reaching the high-energy zone.

19. The method according to claim 18, wherein the first and second liquid streams are initially arranged parallel to one another, flow over a distance x in contact with and parallel to one another before reaching the high-energy zone and are mixed with a static mixer before reaching the high-energy zone.

20. The method according to claim 18, wherein a delay time before the first and second liquid streams reach the high-energy zone is prolonged in a range of from 1 to 100 ms by varying the distance x.

21. The method according to claim 18, wherein a delay time before the first and second liquid streams reach the high-energy zone is prolonged in a range of from 100 up to 500 ms by varying the distance x.

22. The method according to claim 18, wherein a delay time before the first and second liquid streams reach the high-energy zone is prolonged in a range of up to 1 second by varying the distance x.

23. The method according to claim 16, wherein a delay time before the first and second liquid streams reach the high-energy zone is prolonged in a range of up to 2 seconds by varying the distance x.

24. The method according to claim 16, wherein average particle sizes (laser diffractometry, diameter 50%) which are smaller than 0.2 μm are obtained.

25. The method according to claim 16, wherein average particle sizes (photon correlation spectroscopy (PCS), z-average) which are smaller than 500 nm are obtained.

26. The method according to claim 16, wherein average particle sizes (photon correlation spectroscopy (PCS), z-average) which are smaller than 200 nm are obtained.

27. The method according to claim 16, wherein average particle sizes (photon correlation spectroscopy (PCS), z-average) which are smaller than 120 nm are obtained.

28. The method according to claim 16, wherein average particle sizes (photon correlation spectroscopy (PCS), z-average) which are smaller than 50 nm are obtained.

* * * * *